United States Patent [19]
Dewhirst et al.

[11] Patent Number: 5,090,016
[45] Date of Patent: Feb. 18, 1992

[54] MULTIPLE FOCUS BACKWARD RAMAN LASER APPARATUS

[75] Inventors: Donald R. Dewhirst, Torrance; Robert D. Stultz, Huntington Beach, both of Calif.

[73] Assignee: Hughes Aircraft Company, Los Angeles, Calif.

[21] Appl. No.: 655,614

[22] Filed: Feb. 15, 1991

[51] Int. Cl.$^5$ .............................................. H01S 3/30
[52] U.S. Cl. .......................................... 372/3; 372/9; 372/99; 359/327
[58] Field of Search .......................... 372/3, 9, 98, 99; 307/426

[56] References Cited

U.S. PATENT DOCUMENTS 4,821,272  3/1989  Bruesselbach et al. ................. 372/3

Primary Examiner—Léon Scott, Jr.
Attorney, Agent, or Firm—M. E. Lachman; W. J. Streeter; W. K. Denson-Low

[57] ABSTRACT

A Raman laser apparatus for producing a high energy output beam with low divergence. An optical pump beam (14) propagates through first and second focuses (34,36) inside a cell containing a gaseous Raman medium (20) at a pressure selected to promote stimulated Raman scattering (SRS) and suppress stimulated Brillouin scattering (SBS). The pump beam (14) generates a backward SRS wave at the second focus (36), which propagates back through the first focus (34) and acts as a seed for backward SRS therein. The backward SRS wave is amplified at the first focus (34), and extracted therefrom as an output beam (38) by output means (40). Any forward SRS wave which is generated at either the first focus (34) or the second focus (36) may be reflected back through the second focus (36) and then through the first focus (34) to further increase the backward SRS seed beam at the first focus. The output beam (38) is retro-reflected, and has beam divergence comparable to the pump beam divergence. The two focal points (34 and 36) may be in the same or separate Raman cells (16, or 16' and 18). In addition, more than two focal points may be used and these may be in the same or separate Raman cells.

21 Claims, 5 Drawing Sheets

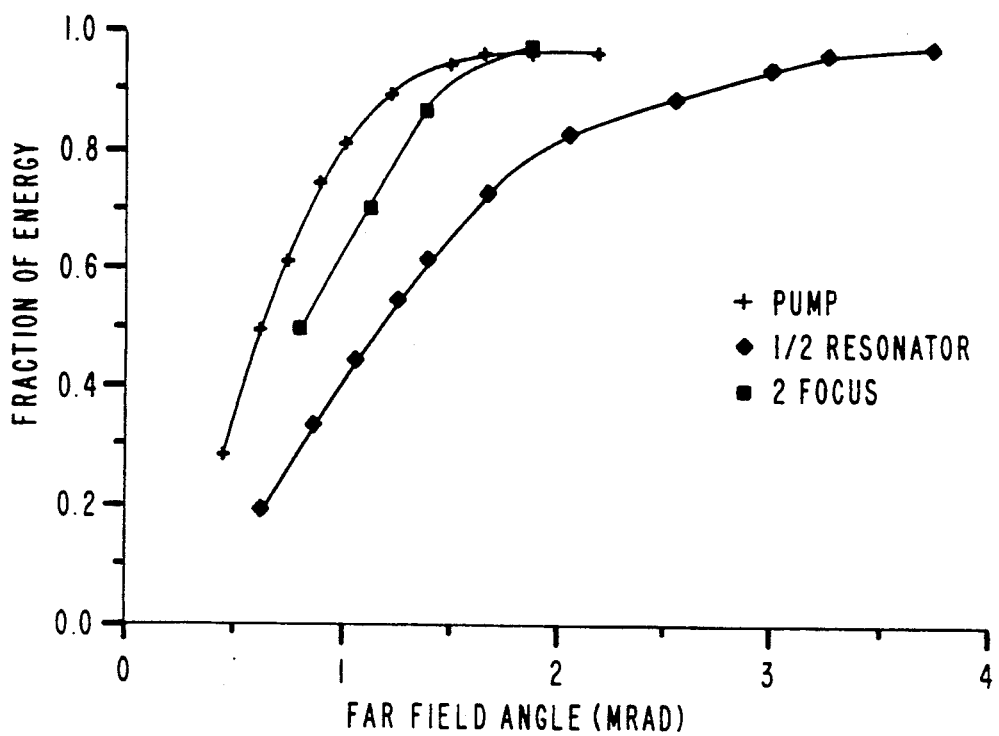
Fig. 4.
Fig. 5.
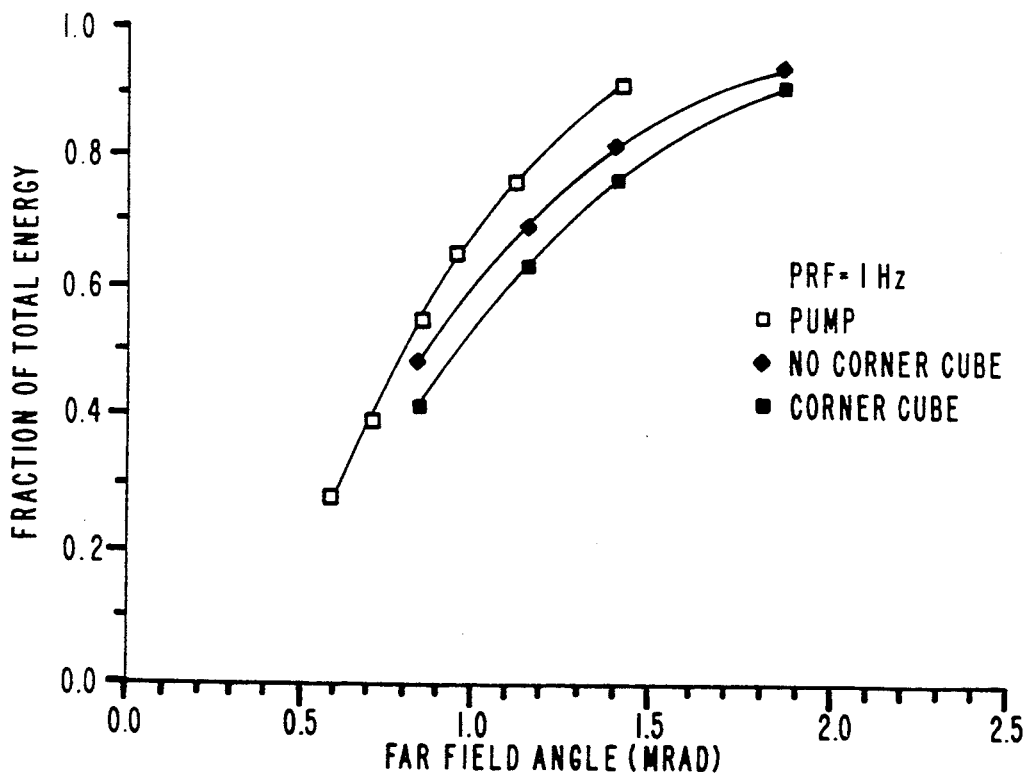

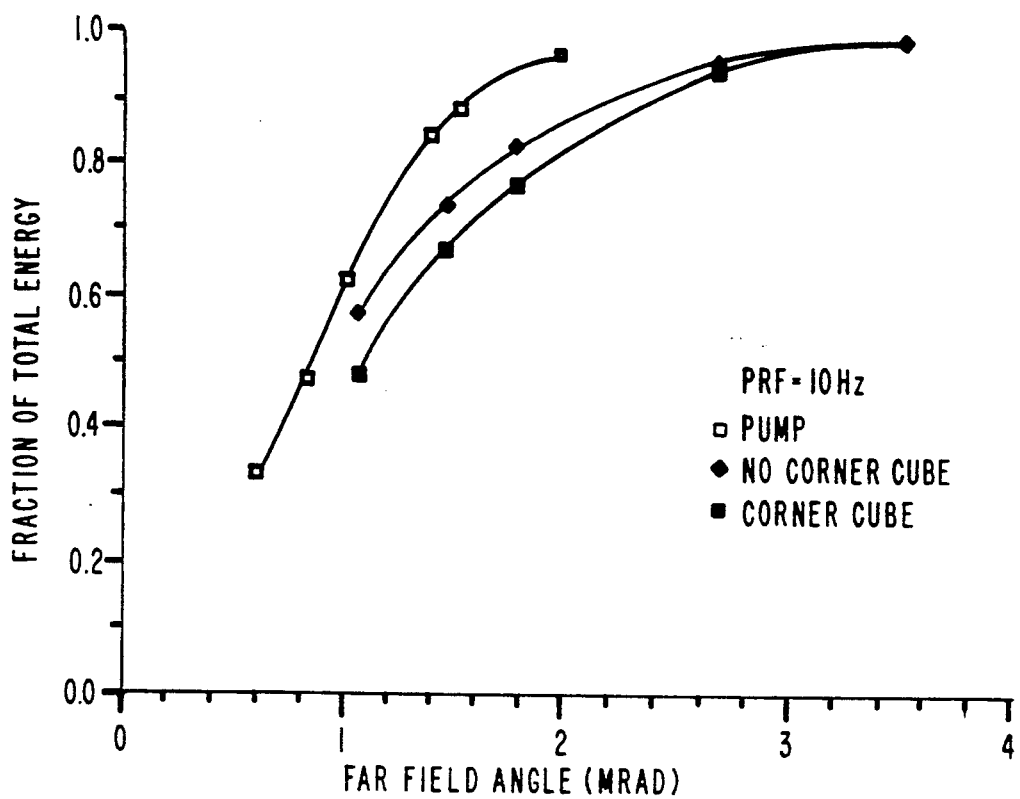
Fig. 6.
Fig. 7.
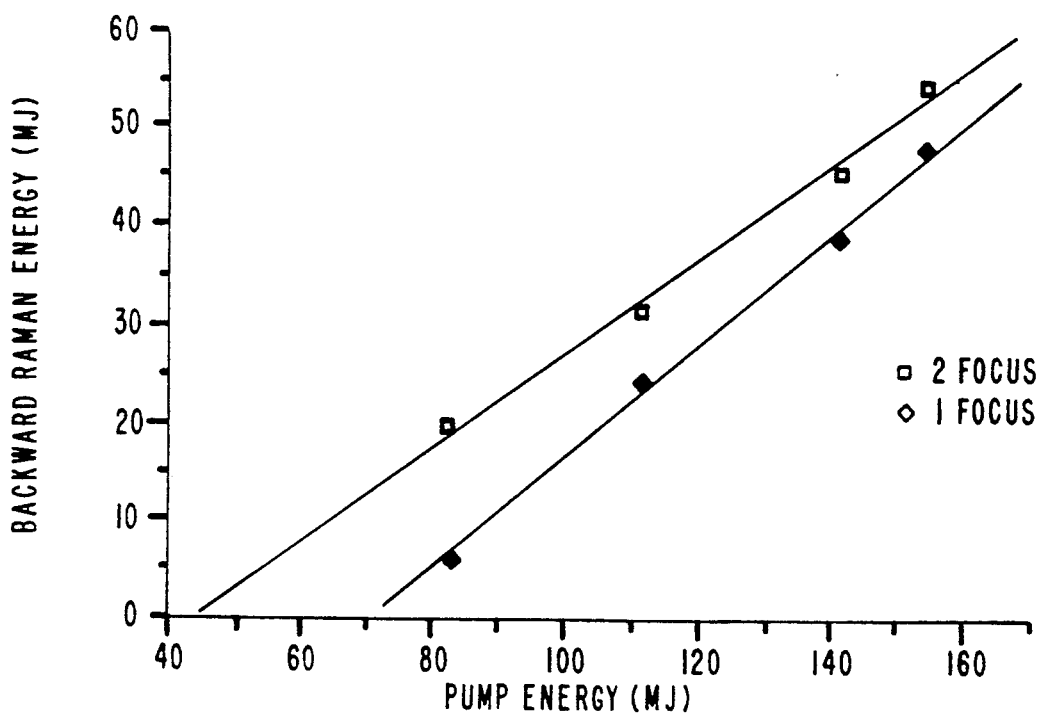

MULTIPLE FOCUS BACKWARD RAMAN LASER APPARATUS

BACKGROUND OF THE INVENTION

1. Field of the Invention

The present invention relates to a laser apparatus and method for producing a high quality, low divergence optical beam having a wavelength shifted from that of an input optical pump beam by a Stokes shift due to stimulated Raman scattering (SRS).

2. Description of the Related Art

Laser sources for various applications are required to emit high quality, coherent beams at a wavelength which will not damage the human eye. The wavelength of 1.54 microns has been generally established as being "eye-safe". However, it is difficult to directly produce a laser beam at this wavelength using conventional lasers.

A Nd:YAG laser in widespread use is capable of producing a high quality beam at 1.06 microns, which is outside of the eye-safe range. Raman laser devices utilizing the Stokes shift in a Raman scattering medium can be used to convert laser radiation of one wavelength to a longer wavelength. Methane is a Raman medium having a vibrational Stokes frequency shift of 2916 $cm^1$, enabling conversion of a 1.06 micron beam to a 1.54 micron beam This conversion may be accomplished as described, for example, in U.S. Pat. No. 4,821,272, entitled "SINGLE MIRROR INTEGRAL RAMAN LASER", issued Apr. 11, 1989 to H. Brusselbach et al, and assigned to the same assignee as the present application.

Raman scattering of an input optical beam in a suitable medium produces both forward and backward propagating SRS waves, as described in a basic treatise on stimulated Raman scattering found in "Tunable Lasers", by J. C. White, Springer Series Topics in Applied Physics, Vol. 59, Springer, Berlin, Heidelberg, 1987, pp. 115-207. The arrangement disclosed in the Brusselbach patent is known as a "Raman half-resonator", and produces a Ramanshifted output using the forward SRS wave. The beam divergence of this type of laser is on the order of twice the pump beam divergence, which is undesirable for certain applications.

The backward SRS wave is retro-reflected back onto the input pump beam. This reduces the number of optical elements that affect output beam alignment in a backward Raman laser. In addition, the backward SRS wave does not parametrically couple to anti-Stokes radiation, whereas the forward SRS wave does. This coupling of the SRS wave to anti-Stokes reportedly causes an effective reduction in gain for the lower order modes of the forward SRS wave, and therefore increases forward Raman beam divergence, as discussed, for example, in the publication by Perry et al., "Stimulated Raman Scattering With a Tightly Focused Pump Beam", *Optics Letters*, Vol. 10, No. 3, 146 (1985).

SUMMARY OF THE INVENTION

The present invention provides a method and apparatus which improve upon the single focus backward SRS laser by providing at least one additional focus in the Raman medium for generating a backward SRS wave which propagates back into the first focus to act as a seed for SRS. The seed beam has an intensity which is much greater than the seed from spontaneous Raman scattering in the first focus. This seed beam interacts with and is amplified by the pump beam at the first focus to produce an output backward SRS wave with greater conversion efficiency than is attainable with a single focus. Also, the present invention can be operated efficiently at much lower pump input power than a single focus backward SRS laser. The present invention also has the advantages of the single focus backward SRS laser in that sensitivity to optics misalignment is reduced and the output beam has low divergence which is comparable to the pump beam.

The apparatus of the present invention comprises:

(a) pump laser means for producing an optical pump beam;

(b) Raman cell means disposed for propagation of the pump beam therethrough;

(c) first focusing means positioned suitably adjacent to the Raman cell means for focusing the optical pump beam into the Raman cell at a first focal point, where a first forward SRS wave and a first backward SRS wave are generated;

(d) second focusing means positioned suitably adjacent to the first focal point to refocus the output from the first focal point to a second focal point where a second forward SRS wave and a second backward SRS wave are generated, wherein the second backward SRS wave propagates backward and seeds the production of the first backward SRS wave to thereby increase the energy of the first backward SRS wave output from the Raman cell means; and (e) output means disposed between the pump laser means and the Raman cell means for directing the first backward SRS wave external of the apparatus.

The first and second or subsequent focal points may be located within the same or separate Raman cells.

These and other features and advantages of the present invention will be apparent to those skilled in the art from the following detailed description, taken together with the accompanying drawings, in which like reference numerals refer to like parts.

BRIEF DESCRIPTION OF THE DRAWINGS

FIG. 4 is a graph illustrating the performance of the apparatus of FIG. 1 in comparison with the prior art;

FIGS. 5 and 6 are graphs depicting the beam divergence of component waves in the present laser apparatus of FIG. 1 at low and high pulse repetition frequency operation respectively;

FIG. 7 is a graph illustrating the backward Raman energy of a two focus, two cell Raman laser apparatus of FIG. 3 as compared, to a single focus laser.

DESCRIPTION OF THE PREFERRED EMBODIMENTS

Figure 1:
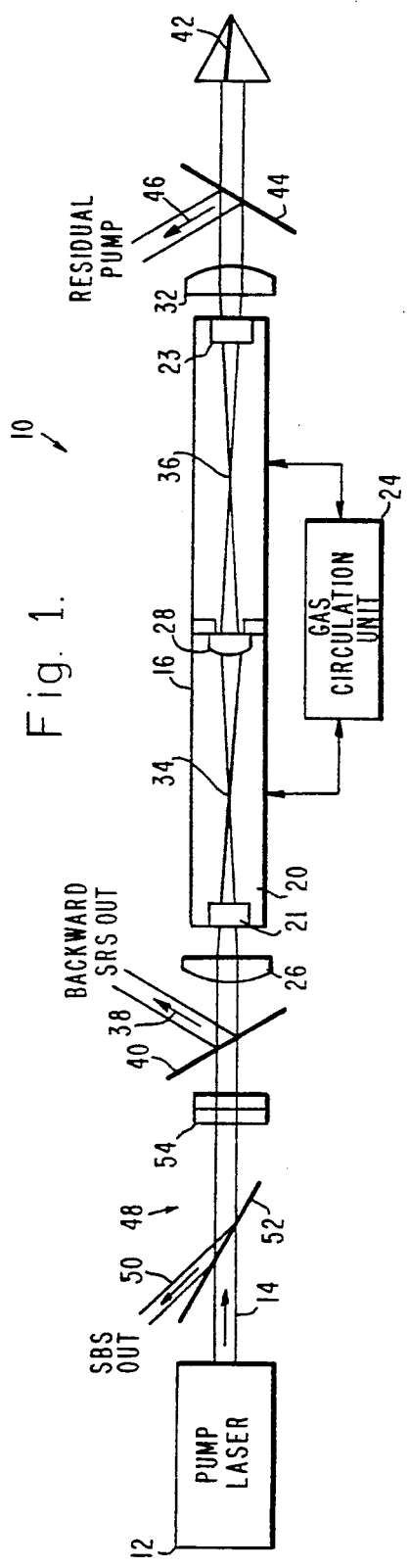
FIG. 1 is a schematic diagram of a single cell, two focus backward Raman laser apparatus in accordance with a preferred embodiment of the present invention.

FIG. 1 illustrates a single cell, two focus backward Raman laser apparatus in accordance with a preferred embodiment of the present invention, which is generally designated as 10, and includes a pump laser 12 for generating a coherent optical pump beam 14. Although the invention is not limited to operation at any particular wavelength, for generation of an eye-safe output beam at 1.54 microns, the laser 12 will typically be a Q-switched Nd:YAG laser producing the pump beam 14 at a wavelength of 1.06 microns. The present invention may be used with any laser which is known for use with Raman cells and any Raman medium.

The laser 12 is disposed such that the pump beam 14 is caused to propagate through a first Raman cell focus 34 and a second Raman cell focus 36 in Raman cell 16. In accordance with convention, propagation from left to right in the figure will be considered to be a forward direction, with propagation from right to left being a backward direction.

The cell 16 is filled with Raman medium 20 which produces the SRS effect. Flat windows 21 and 23 are provided to contain the Raman medium in the cell 16. The preferred medium for producing an eye-safe output beam at 1.54 microns is pressurized methane gas, although deuterium, which has a vibrational Stokes frequency shift of 2991 $cm^{-1}$, is also applicable.

Where the medium 20 is methane gas, it will be maintained at a pressure within the range of approximately 600 to 1000 pounds per square inch gage (psig) or 42.2 to 70.3 kilograms per $centimeter^2$ ($Kg/cm^2$), which is selected to promote SRS and suppress stimulated Brillouin scattering (SBS). SRS gain becomes insufficient at pressures lower than 600 psig, whereas SBS gain becomes excessive at pressure above 1000 psig. Operation at increased pulse repetition frequency (PRF) may be facilitated by circulating the medium 20 at the focuses 34 and 36 using a gas circulation unit 24. Since substantially all of the SRS takes place at the first focus 34, circulation of the gaseous Raman medium 20 at only the first focus 34 usually will be adequate.

Figure 2:
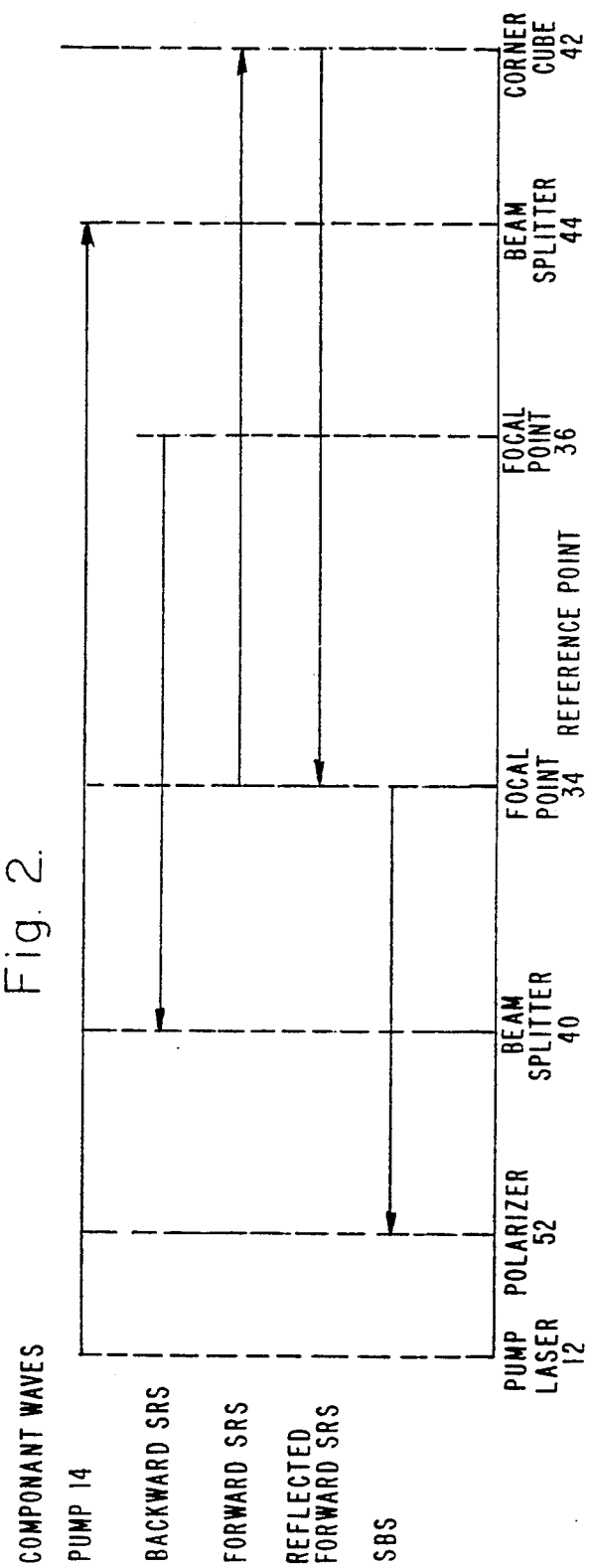
FIG. 2 is a diagram illustrating the component waves in the Raman laser apparatus of FIG. 1.

A converging lens 26 focuses the pump beam 14 into the cell 16 to provide sufficient intensity to exceed the Raman threshold in the cell 16 and enable SRS to occur. A second lens 28 re-focuses the pump beam 14 within the cell 16. A third lens 32 re-collimates the beam after propagation in the forward direction through the cell 16. The following discussion of the propagation of waves in the apparatus of FIG. 1 may be facilitated by reference to FIG. 2, which is a diagram illustrating the component waves generated in the present apparatus 10. Forward and backward SRS waves are generated in interaction regions at focal points 34 and 36, respectively, of the pump beam 14. In accordance with the present invention, the backward SRS wave generated at the focal point 36 in the Raman cell 16 propagates in the backward direction and acts as a seed for backward SRS at the focus 34. The intensity of the backward seed is much greater than the spontaneous Raman scattering at focus 34, and thus the backward SRS wave is amplified at the focus 34 through interaction of the backward seed with the pump beam 14. Where the Raman medium 20 is methane gas and the wavelength of the pump beam 14 is 1.06 microns, the backward SRS wave will have the eye-safe wavelength of 1.54 microns due to the vibrational Stokes shift produced by SRS. Improved operation is facilitated by reducing the distance between the focal points 34 and 36 and thereby the transit time therebetween as much as possible.

The backward SRS wave, which constitutes the output beam of the apparatus 10, and is designated as 38 in FIG. 1, is extracted by an output means, such as a dichroic beamsplitter 40, which directs the output beam 38 external of the apparatus 10 for use in the desired application. The beamsplitter 40 is a conventional wavelength sensitive optical element designed to transmit the 1.06 micron pump beam 14 therethrough and reflect the 1.54 micron backward SRS beam therefrom as the output beam 38.

The backward SRS wave is internally retro-reflected back toward the pump beam 14 in the cell 16, regardless of movement or misalignment of intervening optical elements. This eliminates the optical elements of the Raman cell from affecting the output beam alignment, thereby simplifying the design and reducing the manufacturing cost of the apparatus. In addition, the output beam 38 has low divergence, on the order of 1.3 times the divergence of the pump beam 14, compared to a factor of two for the prior art Raman half resonator configuration.

The forward SRS wave generated in the cell 16 may be unused and allowed to exit from the apparatus 10 from the cell 16 or may be absorbed by known means (not shown). However, as a preferred alternative, the forward SRS wave may be reflected in the backward direction through the cell 16 to further increase the backward SRS seed beam. This function may be performed by a reflector such as a corner cube 42 disposed downstream of the cell 16 in the forward direction. The preferred position for the corner cube 42 is as close to the adjacent end of the cell 16 as possible, although the performance does not deteriorate substantially if the cube 42 is moved away from the cell 16 by a relatively small distance.

The backward SRS polarization is identical to the pump beam polarization, even though the corner cube 42 depolarizes the forward SRS wave. This demonstrates that the Raman conversion occurs almost entirely as backward SRS. Only the Raman seed component polarized like the pump beam 14 has gain. It is within the scope of the invention to replace the corner cube 42 with an alternative reflector, such as a plane mirror (not shown). This results in even higher Raman conversion efficiency since a plane mirror does not de-polarize the feedback beam.

A pump beam dump in the form of a dichroic beamsplitter 44 is provided between the cell 16 and the corner cube 42, to prevent the residual or depleted pump beam, here designated as 46, from re-entering the cell 16 and pump laser 12. The beamsplitter 44 operates on the same principle as the beamsplitter 40, and is designed to transmit the 1.54 micron forward SRS beam, and to reflect the 1.06 micron depleted pump beam 46 external of the apparatus 10. If the corner cube 42 is not used, the pump beam dump is not required.

Additional elements may be provided to facilitate the operation of the apparatus 10 as illustrated in FIG. 1. An optical isolator, generally indicated as 48, may be provided for preventing an SBS wave 50 generated in the cell 16 from propagating backwardly into the pump laser 12. The unit 48 may include a polarizer 52 and a quarter wave plate 54. The method of isolation is not limited to this particular means and may include other known isolation means, such as a polarizer and a Faraday rotator combination. The pump beam 14 is initially linearly polarized, which passes through the polarizer 52. The polarization of the pump beam 14 is converted to circular polarization by the quarter wave plate 54. The polarization of the backwardly propagating SBS wave 50 is also circularly polarized, but of the opposite handedness. This becomes orthogonal to that of the pump beam 14, after passing through the quarter-wave plate. The SBS wave 50 is thereby reflected by the polarizer external of the apparatus 10.

While the apparatus of FIG. 1 shows two focuses, the present invention is not so limited, and may comprise three or more focuses in a single Raman cell.

Figure 3:
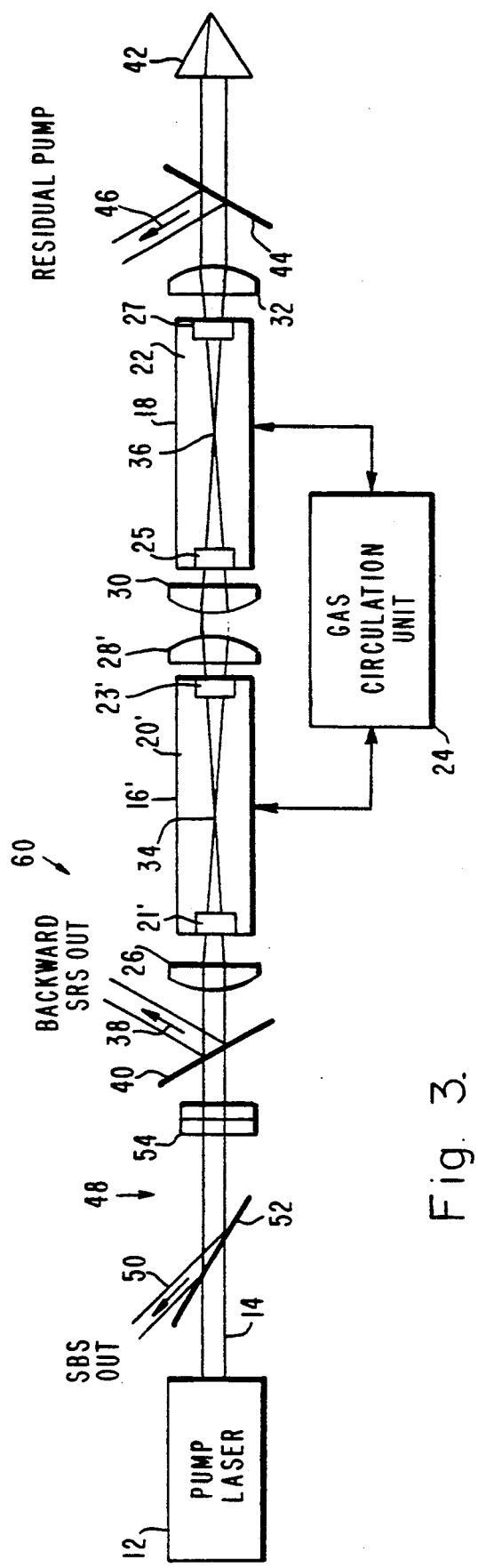
FIG. 3 is a schematic diagram of a two focus, two cell backward Raman laser apparatus in accordance with an alterative embodiment of the present invention.

FIG. 3 illustrates an alternative embodiment of the present invention comprising a two cell, two focus Raman laser apparatus, generally designated as 60. The same reference numerals are used for the same elements in FIG. 3 as in FIG. 1. FIG. 3 differs from FIG. 1 only in that the single Raman cell 16 in FIG. 1 is replaced by two Raman cells 16' and 18, filled with Raman media 20' and 22. Flat windows 21' and 23' in cell 16' and flat windows 25 and 27 is cell 18 are provided to contain the Raman medium in the respective cells. Focus 34 is located in cell 16' and focus 36 is located in cell 18. In addition, the lens 28 in cell 16 in FIG. 1 is replaced by lenses 28' and 30 in FIG. 3. Lens 28' re-collimates the beam after propagation through cell 16'. Lens 30 focuses the beam into cell 22. The operation of the apparatus of FIG. 3 is the same as the operation of the apparatus of FIG. 1, previously described.

Although the apparatus of FIG. 3 is shown as including only the two Raman cells 16' and 18, the present invention is not so limited and, although not specifically illustrated, three or more Raman cells may be provided with a focus in each cell. Further, although the cells in FIG. 3 are illustrated as being disposed in an in-line configuration, they may be arranged in a folded or laterally offset (periscope) configuration, although not shown.

Two and three focus backward Raman configurations in accordance with the present invention were evaluated using methane gas as the Raman medium at fill pressures from 400 to 1000 psig (28.1 to 70.3 Kg/cm$^2$). Operating at reduced pressure lowered the Raman gain, but reduced the SBS gain by a greater amount since reduced pressure lessens competition from SBS. Fill pressures of 600 psig (42.2 Kg/cm$^2$) were sufficient for efficient Raman conversion. Conversion efficiencies of 35% were achieved in experiments with methane.

A two focus, single cell configuration was operated at 10 Hz with gas circulation at the first focus only, as discussed in Example 1. The performance at 10 hertz was comparable to that at low PRF (1Hz) operation, even though the gas was not circulated at the second focus. This demonstrates that the Raman conversion is almost entirely at the first focus. The test data is presented in FIGS. 4, 5 and 6, which are discussed in Example 1. A two focus, two cell configuration was tested as discussed in Example 2. The test data is presented in FIG. 7, which is discussed in Example 2.

A three focus, single cell backward Raman configuration was also tested as discussed in Example 3, using deuterium as the Raman medium, at a pressure of 2000 psig or 140.6 Kg/cm$^2$. The vibrational Stokes shift for deuterium is 2991 cm$^{-1}$, almost the same as that of methane (2916 cm$^{-1}$), so that a laser apparatus using deuterium is also capable of producing an eye-safe output beam in response to a pump beam at 1.06 microns. The purpose of these tests was to reduce SBS. The SBS gain relative to SRS is low for deuterium, and little SBS was encountered in the experiments. The problem with deuterium is that the Raman gain is half that of methane. The three focus configuration and higher pressure partially offset the reduced gain. The measured SBS was small in comparison to that in the methane experiments, but the Raman gain was not quite enough to equal the conversion efficiency of methane. Conversion efficiencies on the order of 30% were achieved in the deuterium tests. The test data is presented in FIGS. 8 and 9, which are discussed in Example 3.

Examples of practice of the present invention are as follows.

EXAMPLE 1

An apparatus as illustrated in FIG. 1 was constructed and tested, and consisted of a single Raman cell having two focuses. The pump input energy was 163 millijoules (mJ) with a pulsewidth of 17 nanoseconds and a PRF of 10 Hz. The gas cell was filled with 1000 psig (70.3 Kg/cm$^2$) of methane. The gas at the first focus (34) was circulated, but the design and construction of the apparatus did not permit circulation of the gas at the second focus (36). The f/numbers of the focuses 34 and 36 were F/33 and F/20, respectively. When the corner cube was used, the backward Raman output was 55 mJ, and the SBS energy was 47 mJ. Without the corner cube, the backward Raman output was 40 mJ, and the SBS was 57 mJ.

FIG. 4 illustrates the performance of the present two focus apparatus of FIG. 1 (2-focus) as compared with a prior art Raman half resonator (designated as "½ resonator") with reference to the pump wave. The horizontal axis represents the full divergence angle in milliradians (mrad) in the far field. The vertical axis represents the fraction of total energy of the 1.54 micron beam or wave contained within the corresponding far field angle. It can be seen in FIG. 4 that a larger fraction of the total energy of the present backward SRS wave is contained in a smaller angle than for the prior art configuration. This is a measure of beam divergence, and indicates that a lower, and thereby more desirable, value of beam divergence is attainable with the present invention than with the prior art configuration.

FIGS. 5 and 6 are similar to FIG. 4, but depict the pump and backward SRS beam divergences of the present apparatus at low PRF (less than 1 Hz), and at 10 Hz, respectively. Although the beam divergence increases with PRF, the results are acceptable for numerous practical applications even at 10 Hz. This increase is due to turbulence caused by not circulating the gas at the second focus. Circulating the gas at the second focus should reduce the 10 Hz beam divergence.

EXAMPLE 2

An apparatus as illustrated in FIG. 3 was constructed and tested, consisting of two gas cells with methane gas at 850 psig (59.8 Kg/cm$^2$) as the Raman medium in both cells. Only the gas in the first cell was circulated. The lenses 26 and 28' had focal lengths of 200 millimeters (mm), and focused the pump beam 14 into the first Raman cell 16' with an f/number of F/33. The lenses 30 and 32 had focal lengths of 125 mm, and focused the pump beam 14 into the second Raman cell 18 with an f/number of F/20. The energy of the input pump beam 14 was 155 mJ, at a PRF of 10 Hz. The energies of the component waves in the apparatus were measured as follows:

Backward SRS (output)—52 mJ
Depleted pump—36 mJ
Forward SRS between cells—9 mJ
SBS—26 mJ Comparative measurements were taken with the corner cube 42 omitted, at the same input pump energy of 155 mJ. The energies of the components waves are as follows:

Backward SRS (output)—38 mJ
Depleted pump—39 mJ
Forward SRS between cells—11 mJ
SBS—39 mJ It will be noted that the corner cube 42 produced the desirable result of increasing the backward SRS energy while decreasing the SBS energy.

FIG. 7 is a graph illustrating the performance of the apparatus of FIG. 3 (designated as "2-focus"), as compared with a single focus backward Raman configuration resulting from omitting the second Raman cell 18 (designated as "1-focus"). A corner cube was used in both the 1-focus and 2-focus configurations to reflect back the forward SRS. It can be seen in FIG. 7 that the backward SRS as a function of pump beam energy is substantially greater for the present two focus configuration than for the single focus configuration.

EXAMPLE 3

Figure 8:
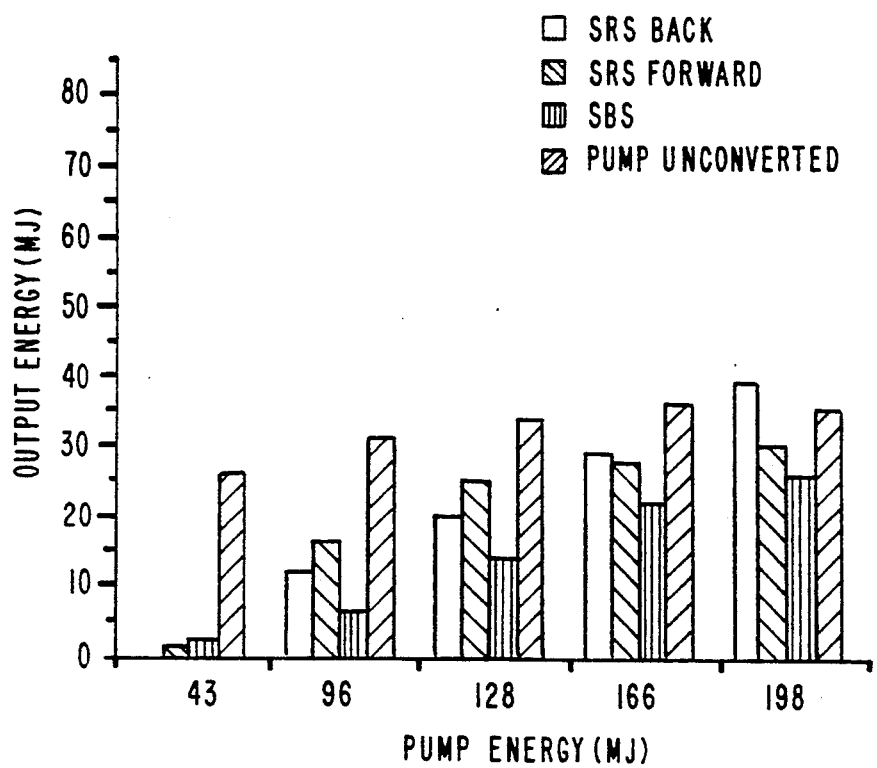
FIGS. 8 and 9 are histograms illustrating the energies of component waves in a three focus backward Raman laser in accordance with the present invention as a function of input laser pump beam energy without and with a corner cube reflector respectively.
Figure 9:
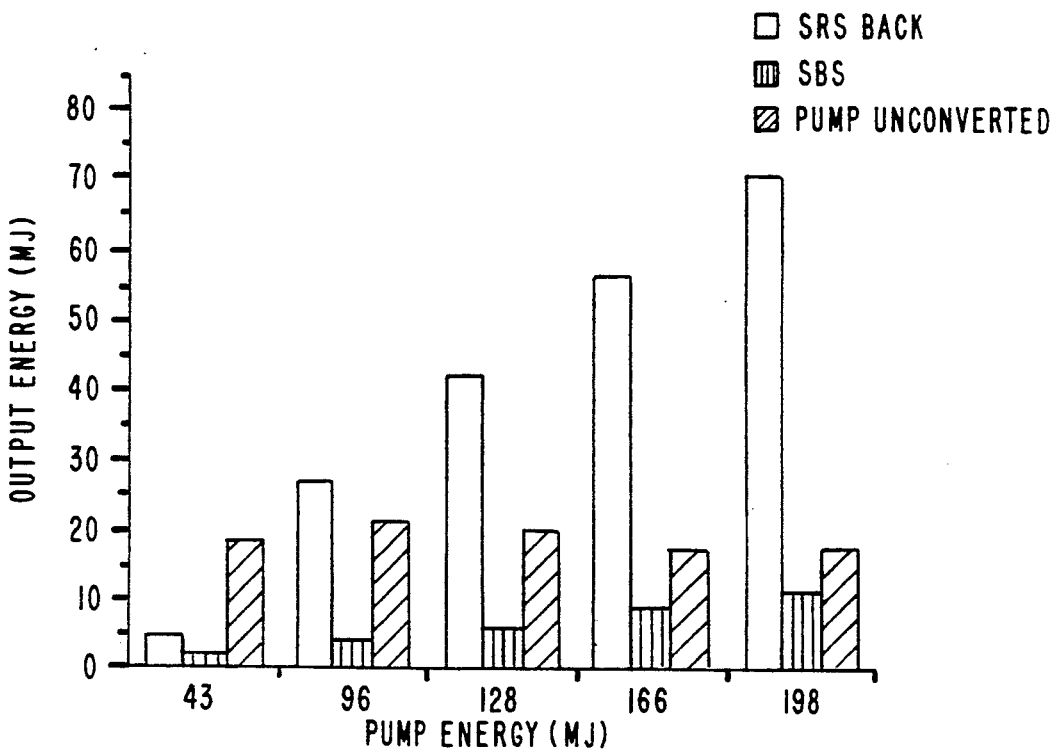

A laser apparatus including a single Raman cell with three focuses was fabricated in accordance with the present invention. The cell contained methane at 600 psig (42.2 Kg/cm$^2$). A pump beam was focused into the cell at f/numbers of F/48, F/37, and F/31. FIGS. 8 and 9 illustrate the output energies of the component waves as a function of input laser pump beam energy, without and with a corner cube, respectively. It will be noted that energy of the backward SRS wave, which constitutes the output of the apparatus, was increased substantially relative to the energy of the SBS wave by adding the corner cube. In addition, the lower pressure of methane resulted in reduced SBS, while Raman conversion efficiency was good as a result of adding a third focus.

While several illustrative embodiments of the invention have been shown and described, numerous variations and alternate embodiments will occur to those skilled in the art, without departing from the scope of the invention. Accordingly, it is intended that the present invention not be limited solely to the specifically described illustrative embodiments. Various modifications are contemplated and can be made without departing from the scope of the invention as defined by the appended claims.

What is claimed is:

1. A stimulated Raman scattering (SRS) laser apparatus, comprising:
    (a) pump laser means for producing an optical pump beam;
    (b) Raman cell means disposed for propagation of said pump beam therethrough;
    (c) first focusing means positioned suitably adjacent to said Raman cell means for focusing said optical pump beam into said Raman cell at a first focal point, where a first forward SRS wave and a first backward SRS wave are generated;
    (d) second focusing means positioned suitably adjacent to said first focal point to refocus the output from said first focal point to a second focal point where a second forward SRS wave and a second backward SRS wave are generated, wherein said second backward SRS wave propagates backward and seeds the production of said first backward SRS wave to thereby increase the energy of said first backward SRS wave output from said Raman cell means; and
    (e) output means disposed between the pump laser means and the Raman cell means for directing the first backward SRS wave external of the apparatus.

2. An apparatus as in claim 1 wherein said second focusing means and said second focal point are located within said Raman cell means.

3. An apparatus as in claim 1 further comprising a second Raman cell means disposed for propagation of the output from said Raman cell means therethrough, wherein said second focusing means is located to provide said second focal point within said second Raman cell means.

4. An apparatus as in claim 1 further comprising a third focusing means positioned suitably adjacent to said second focal point to refocus the output from said second focal point to a third focal point where a third forward SRS wave and a third backward SRS wave are generated wherein said third backward SRS wave propagates backward and seeds the production of said second backward SRS wave.

5. An apparatus as in claim 1 in which the output means comprises dichroic beamsplitter means which transmits the pump beam therethrough and reflects the first backward SRS wave therefrom.

6. An apparatus as in claim 1 further comprising reflector means for reflecting the first forward SRS wave and the second forward SRS wave back through the Raman cell means to increase the optical gain therein.

7. An apparatus as in claim 6 in which the reflector means comprises a corner cube.

8. An apparatus as in claim 1 further comprising stimulated Brillouin scattering (SBS) optical isolator means disposed between the pump laser means and the Raman cell means for directing external of the apparatus an SBS wave generated in the Raman cell means and propagating therefrom toward the pump laser means.

9. An apparatus as in claim 8 in which the optical isolator means comprises polarizer means which transmits the pump beam therethrough and reflects the SBS wave therefrom.

10. An apparatus as in claim 1 further comprising pump beam dump means for directing the pump beam external of the apparatus after propagation thereof through the Raman cell means.

11. An apparatus as in claim 10 further comprising reflector means for reflecting the second forward SRS wave back through the pump beam dump means into the Raman cell means to increase the optical intensity therein.

12. An apparatus as in claim 11 in which the pump beam dump means comprises dichroic beamsplitter means which transmits the second forward SRS wave therethrough and reflects the pump beam therefrom.

13. An apparatus as in claim 1 in which the Raman cell means comprises a gaseous Raman medium at a pressure selected to promote SRS and suppress stimulated Brillouin scattering (SBS).

14. An apparatus as in claim 13 in which the Raman medium comprises a material selected from the group consisting of methane and deuterium.

15. An apparatus as in claim 13 in which the Raman medium comprises methane, and said pressure is within the range of approximately 600 to 1000 pounds per square inch gage (42.2 to 70.3 kilograms per centimeter$^2$).

16. An apparatus as in claim 13 further comprising means for circulating the Raman medium through the cell.

17. A method of producing stimulated Raman scattering (SRS), comprising the steps of:
   (a) causing an optical pump beam to propagate into Raman cell means and focus at a first focal point where a first forward SRS wave and a first backward SRS wave are generated;
   (b) refocusing the output from said first focal point to a second focal point where a second forward SRS wave and a second backward SRS wave are generated, wherein said second backward SRS wave propagates backward and seeds the production of said first backward SRS wave to thereby increase the energy of said first backward SRS wave output from said Raman cell means.

18. A method as in claim 17 further comprising providing a second Raman cell means wherein said second focal point is located in said second Raman cell means.

19. A method as in claim 18 further comprising refocusing the output from said second focal point to a third focal point where a third forward SRS wave and a third backward SRS wave are generated wherein said third backward SRS wave propagates backward and seeds the production of said second backward SRS wave.

20. A method as in claim 17 further comprising directing said first backward SRS wave external of said Raman cell means.

21. A method as in claim 17 further comprising reflecting said second forward SRS wave back through said Raman cell means to thereby increase the optical gain therein.

* * * * *